United States Patent [19]

Burgher et al.

[11] Patent Number: 4,703,158
[45] Date of Patent: Oct. 27, 1987

[54] HIGH FREQUENCY WELDING SYSTEM

[75] Inventors: Peter H. Burgher, Utica; John Boomer, Howell, both of Mich.

[73] Assignee: Marelco Power Systems, Inc., Howell, Mich.

[21] Appl. No.: 846,025

[22] Filed: Mar. 31, 1986

[51] Int. Cl.⁴ .................... B23K 11/10; B23K 11/24
[52] U.S. Cl. ..................................... 219/90; 219/87; 219/119
[58] Field of Search ............... 219/89, 90, 86.25, 116, 219/119, 87, 88

[56] References Cited

U.S. PATENT DOCUMENTS

| | | | |
|---|---|---|---|
| 2,062,287 | 12/1936 | Block | 219/91.2 |
| 2,242,867 | 5/1941 | Martin | 219/87 |
| 2,374,979 | 5/1945 | Carlson et al. | 219/120 |
| 2,961,527 | 11/1960 | Tortorella | 219/90 |
| 3,356,821 | 12/1967 | Width | 219/120 |
| 3,415,973 | 12/1968 | Verbeck | 219/118 |
| 3,558,847 | 6/1968 | Width | 219/87 |
| 3,692,970 | 9/1972 | Gott et al. | 219/56 |
| 4,486,288 | 11/1984 | Schwartz | 219/90 |
| 4,485,289 | 11/1984 | Schwartz | 219/90 |

Primary Examiner—E. A. Goldberg
Assistant Examiner—C. M. Sigda
Attorney, Agent, or Firm—Gifford, Groh, VanOphem, Sheridan, Sprinkle and Dolgorukov

[57] ABSTRACT

A high frequency resistance welding system having a pair of jaws which are pivotally mounted together and are adapted to clampingly engage the work to be welded therebetween. Each jaw has two arms and each arm has a welding tip which engages the work. The welding tips on the arms on one jaw register with the welding tips on the arms on the other jaw. A high frequency alternating electric power source is connected to the first jaw so that the direction of current flow in one arm of the first jaw is opposite from the direction of current flow in the other arm of the first jaw so that the magnetic field caused by the current flow through one arm is substantially offset or cancelled by the current flow through the other arm of the first jaw. In addition, each welding arm is preferably L-shaped thus having an elongated shank with the welding tip at one end of the shank. The elongated shanks in each jaw are positioned closely adjacent and parallel to each other while the welding tips in each jaw are spaced apart from each other by an amount greater than the spacing between the shanks.

8 Claims, 6 Drawing Figures

HIGH FREQUENCY WELDING SYSTEM

BACKGROUND OF THE INVENTION

I. Field of the Invention

The present invention relates to alternating current welding systems and, more particularly, to a high frequency welding system having pincer jaws adapted to clampingly engage the work therebetween.

II. Description of the Prior Art

In the manufacture of automobiles, aircraft and industrial equipment, resistive welding is extensively used throughout the manufacturing process. These previously known devices typically comprise a pair of the pincer fingers which clampingly engage opposite sides of the work with one finger on each side of the work. Electric current in the range of 50–60 hertz is then conducted through the fingers, and thus through the work, thereby forming the weld.

One disadvantage of utilizing resistive welding systems with the electric power supplies at 50–60 hertz is that relatively large and heavy transformers are required in order to supply current to the pincer fingers.

The use of higher welding frequencies, for example 400 hertz, would effectively reduce the size, cost and weight of the transformers necessary to electically couple the pincer fingers to the electrical power source. For the reasons discussed below, however, the use of such higher frequencies has been heretofore impractical.

More specifically, for many applications, each pincer finger comprises an elongated shank having a welding tip at one end. Thus, when the welding tips on the pincer fingers clampingly engage the work, the metal sandwiched in between the two pincer fingers acts like a transformer core. Consequently, when a high frequency electrical power source is applied to the pincer fingers, a great deal of energy is lost to the magnetic field caused by current flow through the pincer fingers which is inductively imparted to the metal clamped or positioned between the fingers.

For example, assuming a transformer of 20,000 A RMS and a welding gun having pincer arms 16 inches long, at 60 hertz of current, approximately 16,000 A RMS of current is applied to the weld while only 4,000 A RMS of power is lost to the magnetic field induced in the work. Conversely, with the same welding gun operated at 400 hertz, only about 3,000 A RMS is applied to the weld while the remaining 17,000 A RMS is lost to inductive field induced in the work. For this reason, high frequency welding systems have not heretofore been extensively employed in such heavy manufacture operations.

SUMMARY OF THE PRESENT INVENTION

The present invention overcomes all of the above mentioned disadvantages of the previously known devices by providing a high frequency welding system for industrial applications.

In brief, the welding system of the present invention comprises a pincer assembly having a first and second jaw which are pivotally secured together and movable between an open and a closed position. In the closed position, the welding jaws are adapted to clampingly engage the work to be welded therebetween.

Each jaw has two welding arms and each welding arm preferably comprises an elongated shank having a welding tip attached to one end. The shanks of the welding arms for each jaw are closely adjacent and parallel to each other while the welding tips on the welding arms for each jaw are spaced apart by a distance greater than the space in between the shanks. In addition, when the jaws are in their closed position, the tip for one arm on the first jaw registers with the tip for one arm on the second jaw and, likewise, the tip for the second welding arm on the first jaw registers with the tip for the second welding arm on the second jaw.

A source of alternating current is electrically connected to each pair of the welding arms in a manner which causes the polarity of the upper arms to be opposite in polarity and, similarly, the polarity in the lower arms to be opposite in polarity. Furthermore, by means of connections having opposite polarity, the source of electrical energy induces current flow in one welding arm of the frist jaw which is opposite in direction from the current flow in the second arm of the first jaw. Consequently, the magnetic field created by current flow through one arm of the first jaw is substantially offset or cancelled by the current flow through the second arm insofar as the intervening work material is concerned. As a result, the magnetic field induced in the work is minimized which, in turn, maximizes the current flow between the welding tips on opposite sides of the work.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
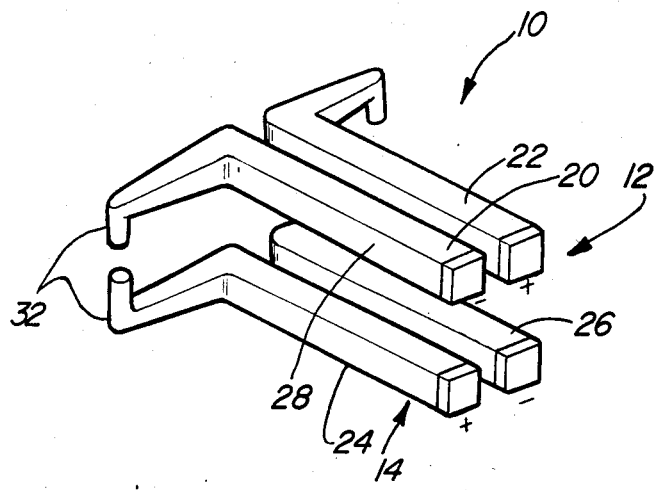
FIG. 1 is perspective view illustrating a preferred embodiment of the invention.
Figure 2:
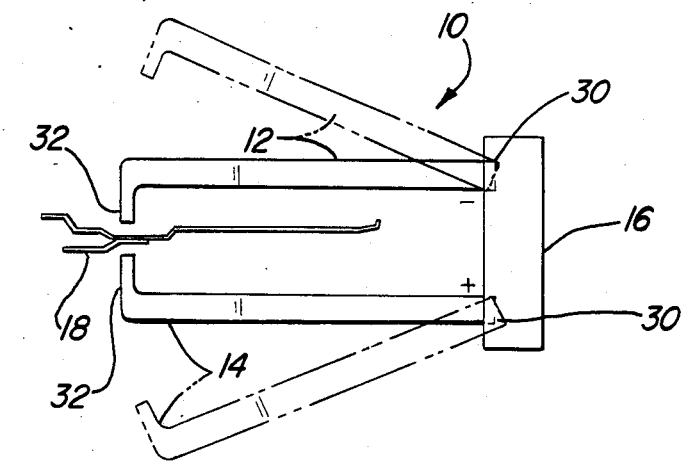
FIG. 2 is a side view illustrating the preferred embodiment of the invention.

With reference first to FIGS. 1 and 2, the preferred embodiment of the present invention comprises a pincer assembly 10 having a first jaw 12 and a second jaw 14. As best shown in FIG. 2, the jaws 12 and 14 are pivotally mounted to each other by conventional means 16 so that the jaws 12 and 14 are pivotal between an open position, illustrated in phantom line, and a closed position, illustrated in solid line. In a closed position, the jaws 12 and 14 are adapted to clampingly engage a metal workpiece 18 to be welded therebetween.

Figure 3:
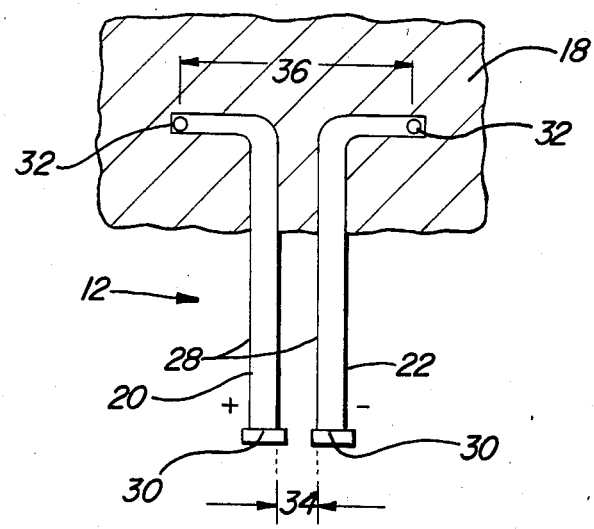
FIG. 3 is a top view illustrating the preferred embodiment of the invention.

With reference now to FIGS. 1 and 3, the jaw 12 comprises a pair of welding arms 20 and 22 and, similarly, the jaw 14 comprises a pair of welding arms 24 and 26. The jaws 12 and 14 are substantially identical to each other.

Each welding arm 20–26 comprises an elongated shank 28 having one end 30 attached to the pivotal mounting means 16. A welding tip 32 is attached to the opposite end of each shank 28 and it is the welding tips 32 which clampingly engage the workpiece 18. In addition, the welding tips 32 are aligned so that the welding tip 32 on the arm 20 registers with the welding tip 32 on the arm 24 when the jaws 12 and 14 are in a closed position and, similarly, the welding tips 32 on the arms 22 and 26 likewise register with each other.

As best shown in FIG. 3, the arms 20–26 are generally L-shaped having elongated shanks 28 which are spaced apart and parallel to each other. These shanks 28 are spaced apart by a distance 34 along their entire length. The distance 34 is preferably very small and varies as a function of frequency. For example, at 400 hertz the distance 34 should not exceed about 0.060 inches and about 0.25 inches at 1200 hertz, and under any circumstances should be as small as is possible.

Conversely, the welding tips 32 on the welding arms 20 and 22 are spaced apart from each other by a distance 36 which is preferably at least twice the distance 34 for a reason to be subsequently described.

Figure 4:
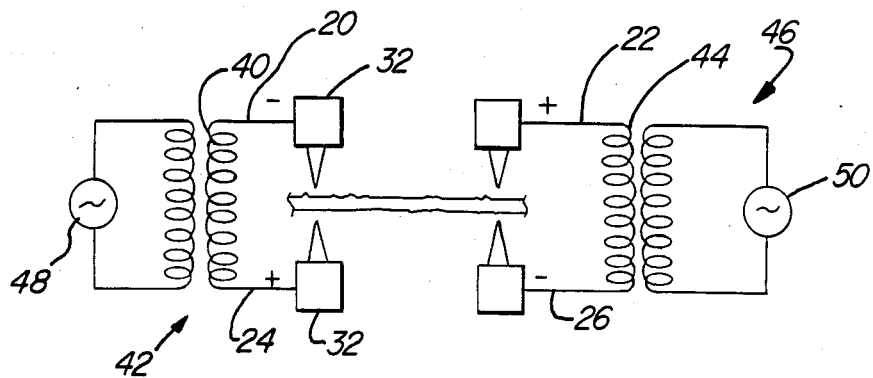
FIG. 4 is a diagrammatic view illustrating the preferred embodimen of the invention.

With reference now to FIG. 4, the welding system of the present invention is illustrated diagrammatically in which the welding arms 20 and 24 are electrically connected to opposite ends of the secondary coil 40 of a transformer 42. Similarly, the welding arms 22 and 26 are electrically connected to opposite ends of the secondary coil 44 of a transformer 46. The primaries of both transformers 42 and 46 are connected to conventional alternating current power sources 48 and 50 which, although illustrated separately in FIG. 4, may comprise a single power source.

The electrical polarity of both the voltage and current direction of the welding arms 20 and 24 are opposite from each other, thus inducing current flow between the welding tips 32 on the welding arms 20 and 24. The power supply 50, however, is synchronized with respect to the power supply 48 as to both the polarity and the timing of the impulses, and thus the current flow through the welding arm 22 is simultaneously opposite than the welding arm 20 and, likewise, the current flow through the welding arm 26 is simultaneously opposite from the current flow through the welding arm 24. In other words, the current flow through the welding arms on each jaw is in opposite directions and flows at exactly the same time.

With reference again to FIGS. 3 and 4, since the current flows through the arms 20 and 22 are equal but in opposite directions from each other and also since the shanks 28 of the arms 20 and 22 are closely adjacent each other, the magnetic field created by current flow through one arm 20 substantially cancels or offsets the magnetic field created by current flow through the other arm 22. This in turn minimizes the amount of inductive energy imparted to the workpiece 18 which maximizes the current flow between the registering welding tips 32 thereby increasing welding effeciency.

As previously described, it is highly desirable that the welding tips 32 be spaced apart from each other a minimum distance of at least twice as great as the spacing between the shanks 28 of the welding arms. This increased spacing of the welding tips 32 thus minimizes the amount of surface current flow between the welding tips 32 on each jaw.

Figure 5:
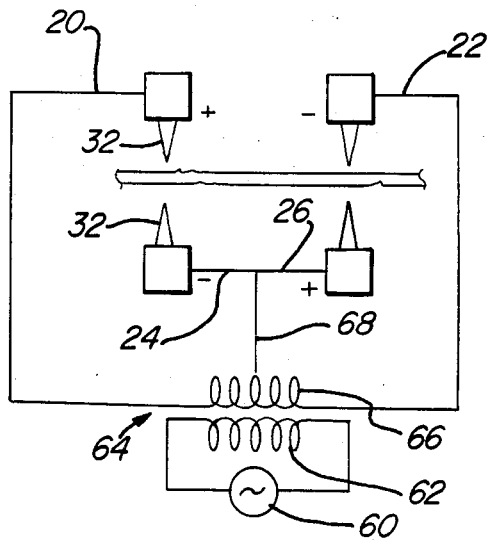
FIG. 5 is a view similar to FIG. 4 and illustrating a modification thereof.

With reference now to FIG. 5, a modification of the present invention is thereshown in which a power source 60 supplies power to the primary coil 62 of the transformer 64 having a secondary coil 66. One end of the secondary coil 66 is electrically connected to the welding arm 20 while the opposite end of the secondary coil 66 is connected to the welding arm 22. A center tap 68 is electrically connected to the welding arms 26 and 24. This electrical system produces the same electrical polarities and current flow directions as have been previously described.

Figure 6:
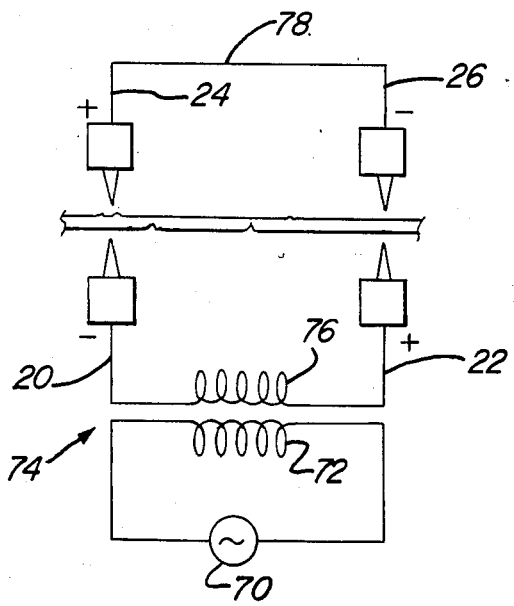
FIG. 6 is a view similar to both FIGS. 4 and 5 and illustrating still a further modification thereof.

With reference now to FIG. 6, a still further modification of the present invention is thereshown in which a power supply 70 drives the primary coil 72 of a transformer 74. One end of the transformer secondary coil 76 is electrically connected to the welding arm 20 while the other arm is electrically connected to the welding arm 22. Conversely, the welding arms 24 and 26 are directly electrically connected to each other by a cross link 78 which is of a lower electrical resistance than the workpiece 18 to be welded. Thus, the welding system illustrated in FIG. 6 achieves opposite current flow through the welding arms 20 and 22 and also the welding arms 24 and 26 thereby minimizing inductive heating of the workpiece 18 for the reasons previously discussed.

In practice, welding frequencies in excess of sixty hertz, preferably in excess of 200 hertz and preferably 400 hertz or 1200 hertz or more are used to power the welding tips and to perform the desired welds. Such high frequencies result in substantial cost, weight and size reductions for the power transformers necessary to connect the welding jaws to the power source.

A still further advantage of the present invention is that it performs two welds simultaneously. This in turn reduces the welding time necessary to complete a multiple weld workpiece.

A still further advantage of the present invention is that it enables high frequency current to be used for welds which was not previously possible due to their depth. Furthermore, the overall length of the welding jaws is virtually unlimited since the present invention automatically compensates for the previously known inductive losses.

Having described our invention, however, many modifications thereto become apparent to those skilled in the art to which it pertains without deviation from the spirit of the invention as defined by the scope of the appended claims.

We claim:

1. A welding system comprising:
   a pincer assembly comprising a first and second jaw, each jaw comprising a pair of welding arms;
   means for pivotally mounting said first jaw to said second jaw so that said jaws are movable between an open and a closed position, said jaws adapted to clampingly engage a work therebetween, wherein when said jaws are in said closed position, one arm on said first jaw registers with one arm on said second jaw and the other arm on said first jaw registers with the other arm on said second jaw; and
   means for supplying an alternating electrical current to the arms of said first jaw so that the polarity of current flow in one arm of said first jaw is opposite from the polarity of current flow in the other arm of said first jaw and, simultaneously, the polarity of one arm in the second jaw is opposite from the polarity of the other arm of the second jaw;
   wherein each welding arm comprises an elongated shank having a welding tip at one end, said tips engaging the work when said jaws are in said closed position, and wherein said tips on said first jaw are spaced apart from each other by a distance sufficiently greater than the distance between the shanks of the arms of said first jaw to reduce the amount of surface current flow between said welding tips and said first jaw.

2. The invention as defined in claim 1 and comprising means for supplying electrical current to said second jaw so that the polarity of current flow in one arm of said second jaw is opposite from the polarity of current flow in the other arm of said jaw, and so that the polarity of current flow in each arm in said second jaw is opposite from the direction of current flow of the corresponding arm of the first jaw.

3. The invention as defined in claim 1 wherein the distance between said tips on said first jaw is at least twice as great as the distance between the shanks on said first jaw.

4. The invention as defined in claim 3 wherein each arm of said first jaw is L-shaped, said shanks of said first jaw being elongated, spaced apart and substantially parallel to each other.

5. The invention as defined in claim 1 wherein said means for supplying said alternating current has a frequency in excess of sixty hertz.

6. The invention as defined in claim 1 wherein said means for supplying said alternating current has a frequency in excess of two hundred hertz.

7. The invention as defined in claim 5 wherein said means for supplying said alternating current has a frequency of substantially 400 hertz.

8. The invention as defined in claim 5 wherein said means for supplying said alternating current has a frequency of substantially 1200 hertz.

* * * * *